United States Patent
Sherkhonov et al.

(10) Patent No.: US 10,855,563 B2
(45) Date of Patent: *Dec. 1, 2020

(54) SUPPLEMENTING LOG MESSAGES WITH METADATA

(71) Applicant: Red Hat, Inc., Raleigh, NC (US)

(72) Inventors: Anton Sherkhonov, Lowell, MA (US); Peter A. Portante, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 2 days.

This patent is subject to a terminal disclaimer.

(21) Appl. No.: 16/398,902

(22) Filed: Apr. 30, 2019

(65) Prior Publication Data

US 2019/0260652 A1 Aug. 22, 2019

Related U.S. Application Data

(63) Continuation of application No. 15/251,641, filed on Aug. 30, 2016, now Pat. No. 10,305,753.

(51) Int. Cl.
*H04L 12/26* (2006.01)
*H04L 12/24* (2006.01)

(52) U.S. Cl.
CPC .................. *H04L 43/04* (2013.01)

(58) Field of Classification Search
CPC ....... H04L 43/04; H04L 43/06; H04L 43/065; H04L 43/12; H04L 41/06; H04L 41/046; H04L 41/069; H04L 41/0609; H04L 41/0853; H04L 67/10
USPC ....................................................... 709/224
See application file for complete search history.

(56) References Cited

U.S. PATENT DOCUMENTS

| 5,893,106 | A | * | 4/1999 | Brobst .................. G06F 8/24 |
| 6,466,970 | B1 | * | 10/2002 | Lee .................. H04L 29/06 |
| | | | | 709/203 |
| 6,542,907 | B1 | * | 4/2003 | Cohen .................. G06F 16/221 |
| 6,721,747 | B2 | | 4/2004 | Lipkin |
| 7,418,457 | B2 | | 8/2008 | Kaler et al. |
| 7,587,725 | B2 | * | 9/2009 | Morrison .................. G06F 9/54 |
| | | | | 719/328 |
| 8,280,932 | B2 | | 10/2012 | Horn |
| 8,402,002 | B2 | | 3/2013 | Adam |
| 8,429,131 | B2 | | 4/2013 | Blumenau et al. |
| 8,543,534 | B2 | | 9/2013 | Alves et al. |
| 8,949,317 | B2 | | 2/2015 | Soloway |

(Continued)

OTHER PUBLICATIONS

Author Unknown, "Cloudera Data Management," Cloudera, Inc., Cloudera Navigator Navigator 2.4.x, Jun. 21, 2016, 59 pages.

(Continued)

*Primary Examiner* — Ruolei Zong
(74) *Attorney, Agent, or Firm* — Withrow & Terranova, PLLC

(57) ABSTRACT

Mechanisms for supplementing log messages are disclosed. A log collection agent initiates, to a centralized management system, a request for metadata associated with a first executing process of the computing device. The log collection agent determines that a log message has been generated by the first executing process. The log collection agent generates a log entry that includes the log message and the metadata. The log collection agent sends the log entry to a centralized logging system that consolidates log messages from a plurality of executing processes including the first executing process.

20 Claims, 6 Drawing Sheets

(56) References Cited

U.S. PATENT DOCUMENTS

| | | | |
|---|---|---|---|
| 9,098,542 B2 | 8/2015 | Prahlad et al. | |
| 9,189,355 B1* | 11/2015 | Moturu | G06F 11/301 |
| 2012/0016802 A1 | 1/2012 | Zeng et al. | |
| 2013/0247045 A1* | 9/2013 | Fitzgerald | G06F 9/45558 |
| | | | 718/1 |
| 2015/0161123 A1* | 6/2015 | Sterling | G06F 16/24552 |
| | | | 707/755 |
| 2015/0324219 A1* | 11/2015 | Fitzgerald | G06F 21/53 |
| | | | 718/1 |

OTHER PUBLICATIONS

Drahon, Alexander, "Central Log Management in OpenShift Enterprise," OpenShift, Nov. 25, 2014, 7 pages, https://blog.openshift.com/central-log-management-openshift-enterprise/.

Martin, Chris, "Enhanced Windows Security Event Log Collection," Log Rhythm, May 26, 2016, 9 pages, https://logrhythm.com/blog/enhanced-windows-security-event-log-collection/.

Swift, David, "Successful SIEM and Log Management Strategies for Audit and Compliance," The SANS Institute, Nov. 4, 2010, 40 pages.

Non-Final Office Action for U.S. Appl. No. 15/251,641, dated Jul. 9, 2018, 11 pages.

Notice of Allowance for U.S. Appl. No. 15/251,641, dated Jan. 7, 2019, 7 pages.

\* cited by examiner

SUPPLEMENTING LOG MESSAGES WITH METADATA

RELATED APPLICATION

This application is a continuation of co-pending U.S. patent application Ser. No. 15/251,641, filed on Aug. 30, 2016, entitled "SUPPLEMENTING LOG MESSAGES WITH METADATA," which is hereby incorporated herein by reference in its entirety.

TECHNICAL FIELD

The examples relate generally to log messages, and in particular, to efficiently supplementing log messages with metadata.

BACKGROUND

Executing processes often generate log messages that can be useful in a variety of circumstances, such as determining what caused a malfunction in an executing process. In conventional computing architectures, a majority of processes may be executing on a single host, and the log messages from each executing process may be located on the same host and relatively easy to locate and process. Platform as a service (PaaS) cloud computing services are increasing in popularity. In a PaaS service, each executing process of a distributed system may execute on a different host. Locating and processing log messages from tens, hundreds, or even thousands of different hosts can be a logistical challenge. One solution to this problem is a centralized logging system that consolidates log messages from different hosts.

SUMMARY

The examples greatly reduce message requests from log collection agents to a centralized management system, and greatly reduce the size of log entries sent by the log collection agents to a centralized logging system. In particular, in one example, metadata is characterized as either immutable metadata that does not change over a lifetime of a logged entity with which an executing process is associated, or as mutable metadata that may change over the lifetime of the logged entity. A log collection agent executing on a same host as an executing process initiates a request to a centralized management system for metadata associated with the executing process. In response, the centralized management system obtains a unique identifier (UID) that uniquely identifies immutable metadata associated with the logged entity with which the executing process is associated, and sends the UID to the log collection agent. The log collection agent need not initiate additional requests for the UID or the immutable metadata from the centralized management system for the life of the executing process. The log collection agent adds the UID to the log messages to supplement the log messages in place of the actual immutable metadata which may be substantially larger in size than the UID. The log collection agent sends the supplemented log messages to the centralized logging system, where the UIDs and corresponding immutable metadata can subsequently be accessed in conjunction with the log messages.

In one example a method for supplementing log messages is provided. The method includes initiating, by a log collection agent executing on a computing device comprising a processor device, to a centralized management system, a request for metadata associated with a first executing process of the computing device. The method further includes determining that a log message has been generated by the first executing process. The method further includes generating a log entry comprising the log message and the metadata. The method further includes sending the log entry to a centralized logging system that consolidates log messages from a plurality of executing processes including the first executing process.

In another example a system is provided. The system includes a first computing device that has a communication interface to communicate with a network, and a processor device coupled to the communication interface to determine that a first executing process generates log messages. The processor device is further to initiate, to a centralized management system, a request for metadata associated with the first executing process. The processor device is further to determine that a log message has been generated by the first executing process, and generate a log entry comprising the log message and the metadata. The processor device is further to send the log entry to a centralized logging system that consolidates the log messages from a plurality of executing processes including the first executing process.

In another example a computer program product for supplementing log messages is provided. The computer program product is stored on a non-transitory computer-readable storage medium and includes instructions to cause a processor device to determine that a first executing process generates the log messages. The instructions further cause the processor device to initiate, to a centralized management system, a request for metadata associated with the first executing process. The instructions further cause the processor device to determine that a log message has been generated by the first executing process. The instructions further cause the processor device to generate a log entry comprising the log message and the metadata. The instructions further cause the processor device to send the log entry to a centralized logging system that consolidates the log messages from a plurality of executing processes including the first executing process.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
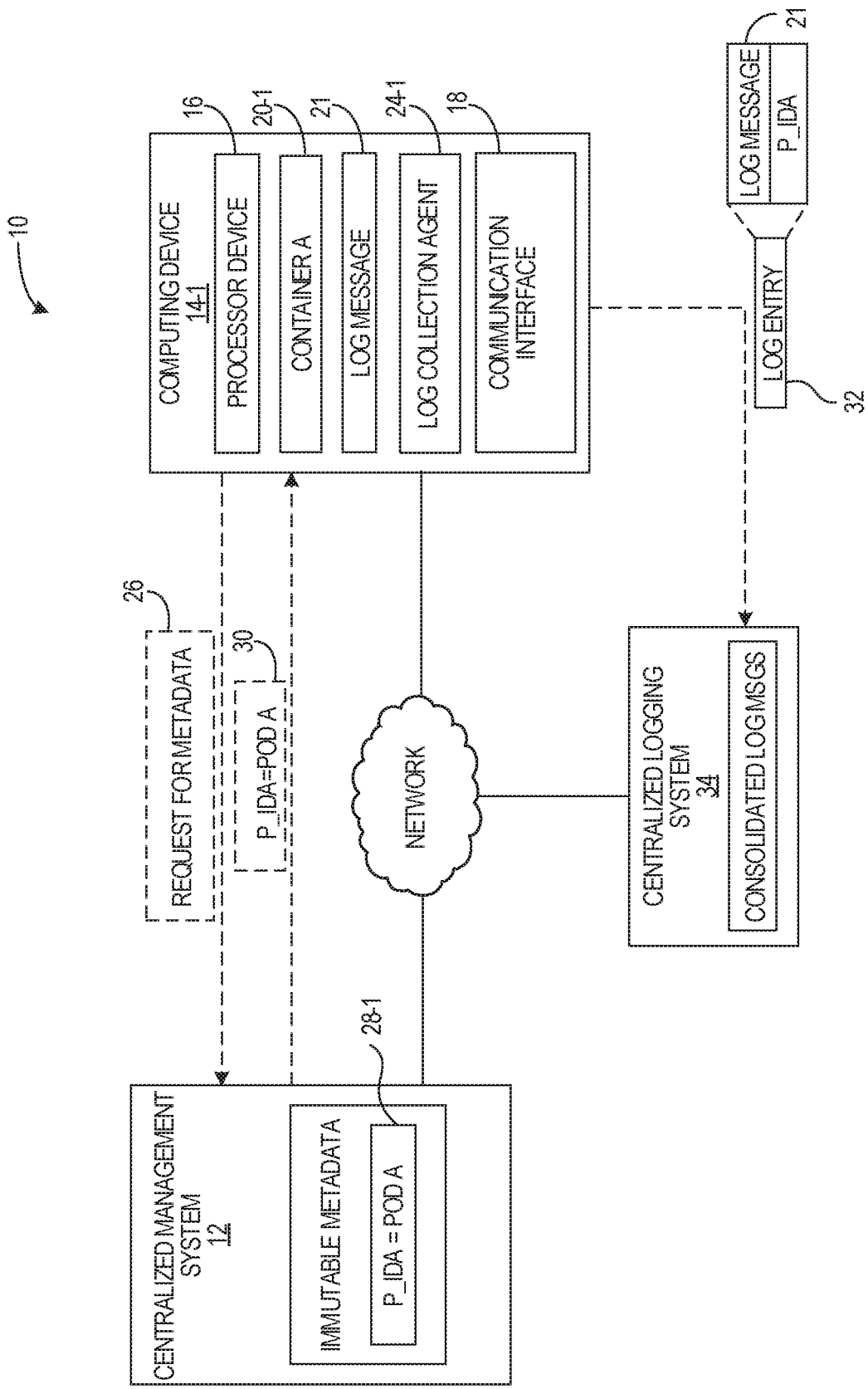
FIG. 1 is a block diagram of a system in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts or message flow diagrams discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first executing process" and "second executing process," and does not imply a priority, a type, an importance, or other attribute, unless otherwise stated herein. As used herein and in the claims, the articles "a" and "an" in reference to an element refers to "one or more" of the element unless otherwise explicitly specified.

Executing processes often generate log files that contain log messages that can be useful in a variety of circumstances, such as determining what caused a malfunction in a process. In conventional computing architectures, a majority of executing processes may be executing on a single host, and the log messages from each executing process may be located on the same host and relatively easy to locate and process.

Platform as a service (PaaS) cloud computing services are increasing in popularity. In a PaaS service, each executing process of a distributed system may execute on a different computing device, sometimes referred to herein as a host. Locating and processing log messages from tens, hundreds, or even thousands of different hosts can be a logistical challenge.

One solution to this problem is a centralized logging system that consolidates log messages from different hosts. A centralized logging system consolidates log messages from different hosts where the log messages can be more easily analyzed and processed. Some centralized logging systems include search technologies that index log messages based on metadata or other information.

Sometimes log messages generated by an executing process may be supplemented by a log collection agent with metadata to provide information that may be useful when subsequently analyzing the log message. For example, the log collection agent may add the host name and/or IP address of the host on which the log message was created to the log message. In a context of containers, the log collection agent may add metadata about containers or other related processes to the log message. However, the metadata being added by the log collection agent may be generated and maintained by a centralized management system that executes on another host, and thus the metadata may be initially unknown to the log collection agent. In order to obtain the metadata, the log collection agent requests the metadata from the centralized management system. These requests generate network traffic and utilize network bandwidth, particularly if done for each log message. Responding to such requests also utilizes processing time of the centralized management system. Moreover, metadata can substantially increase the size of a log message, resulting in a relatively large amount of data being sent to the centralized logging system, reducing network bandwidth for other communications. When hundreds or thousands of log collection agents repeatedly request metadata from the centralized management system, and generate relatively large log messages which are sent to the centralized logging system over the network, the cumulative effect can be problematic.

The examples greatly reduce message requests from log collection agents to a centralized management system, and greatly reduce the size of log entries sent by the log collection agents to a centralized logging system. The examples also facilitate scalability of a distributed computing environment where executing processes execute on different computing devices and log messages are centralized on a centralized logging system.

In particular, in one example, an executing process is associated with a logged entity. The logged entity has metadata that is characterized as either immutable metadata that does not change over the lifetime of the logged entity, or as mutable metadata that may change over the lifetime of the logged entity. Immutable metadata, for example, may be a name of the logged entity. Mutable metadata, for example, may be a status of an executing process associated with the logged entity.

A log collection agent executing on a same host as the executing process initiates a request to a centralized management system for metadata associated with the executing process. In response, the centralized management system obtains a unique identifier (UID) that uniquely identifies immutable metadata of the logged entity with which the executing process is associated, and sends the UID to the log collection agent. The log collection agent need not initiate additional requests for the UID from the centralized management system for the life of the executing process. The log collection agent adds the UID to the log messages to supplement the log messages in place of the actual immutable metadata, such as a textual identifier or the like, which may be substantially larger in size than the UID. The log collection agent sends the supplemented log messages to a centralized logging system.

A central log agent that monitors the centralized management system detects that the UID has been associated with the immutable metadata and generates a log entry that indicates that the UID is associated with the immutable metadata. The central log agent sends the log entry to the centralized logging system. Thus the centralized logging system contains information that correlates the UID contained in log entries received from the log collection agent with the immutable metadata that is identified by the UID. In this manner, message traffic between log collection agents and the centralized management system is greatly reduced. Moreover, because the UIDs are generally substantially smaller in size than the immutable metadata identified by the UIDs, the log entries generated by the log collection agents are reduced in size, resulting in lower network utilization.

FIG. 1 is a block diagram of a system 10 in which examples may be practiced. The system 10 includes a centralized management system (CMS) 12. The CMS 12 may comprise any system that manages executing processes that are distributed among a plurality of different hosts. The phrase "host" as used herein refers to a hardware computing device, or a virtual machine that executes on a computing device. Non-limiting examples of virtual machines are Red Hat® Enterprise Virtualization virtual machines, and VMWARE virtual machines. In some examples, the centralized management system (CMS) 12 may be part of a Platform as a Service (PaaS) cloud computing service, such as Red Hat OpenShift® PaaS, however, the examples are not limited to any particular centralized management system or PaaS.

The system 10 also includes a computing device 14-1 that comprises a processor device 16 and a communication interface 18 that is configured to communicate with a network. The computing device 14-1 hosts an executing process identified as a container 20-1. Solely for purposes of illustration, the examples will be discussed herein in the context of a PaaS such as Red Hat OpenShift, and certain of the metadata and other aspects are provided in the context of an OpenShift environment, however, as discussed above, the examples are not limited to any particular PaaS environment.

The container 20-1 generates log messages, such as a log message 21. A log collection agent (LCA) 24-1 determines that the container 20-1 generates the log message 21. The LCA 24-1 initiates a request 26 to the CMS 12 for metadata associated with the container 20-1. The CMS 12 identifies immutable metadata 28-1 which identifies a logged entity with which the container 20-1 is associated. The logged entity may comprise any entity with which it is desired to associate log messages generated by the container 20-1. In this example, the logged entity is a pod which is a logical entity generated by the CMS 12, and is used to group one or more containers 20. A pod has a lifetime defined as an interval of time between a start time of the pod and an end time of the pod. The pod has a unique identifier (UID) that identifies immutable metadata of the pod, for example, a name of the pod. The pod in this example has a name "Pod A." The name of the pod is immutable because the name of the pod cannot change over the lifetime of the pod. The container 20-1 also has a lifetime defined as an interval of time between a start time of the container 20-1 and an end time of the container 20-1. Because the name of the pod cannot change over the lifetime of the container 20-1, the name of the pod also constitutes immutable metadata with respect to the container 20-1.

The CMS 12 determines that the container 20-1 is associated with the pod, and obtains the UID. The CMS 12 sends a message 30 to the LCA 24-1 that identifies the pod by name (e.g., "Pod A") and also by UID (e.g., P_IDA). The LCA 24-1 generates a log entry 32 that includes the log message 21 and the UID P_IDA. The LCA 24-1 sends the log entry 32 to a centralized logging system 34.

Figure 2:
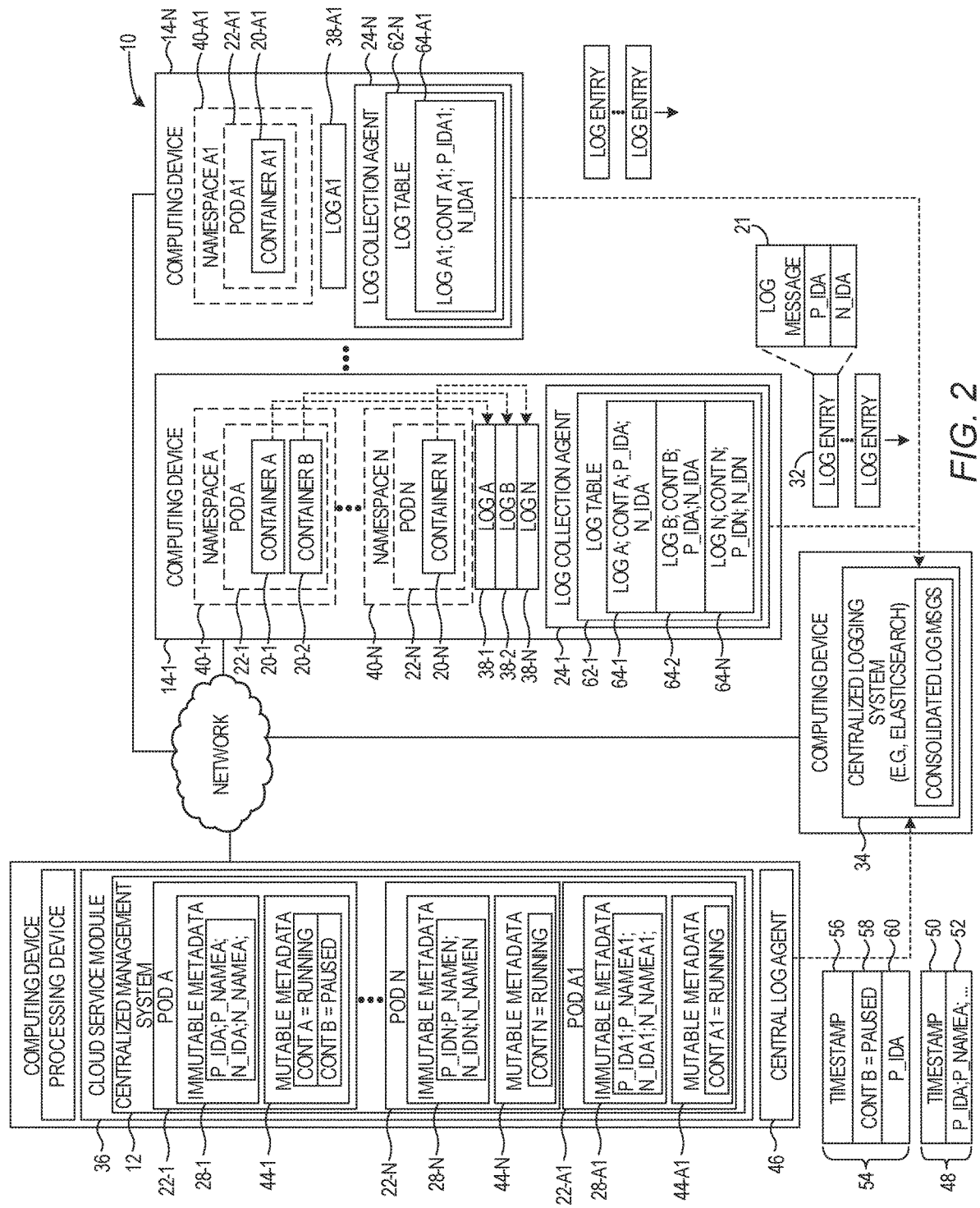
FIG. 2 is a block diagram of the system illustrated in FIG. 1 in greater detail according to one example.

FIG. 2 is a more detailed block diagram of the system 10 illustrated in FIG. 1 according to one example. In this example, the CMS 12 is part of a cloud service module 36 that implements a PaaS cloud computing service. The cloud service module 36 manages the initiation of executing processes on a plurality of computing devices 14-1-14-N (generally, computing devices 14). While for purposes of illustration only two computing devices 14 are illustrated, the system 10, in operation, could include tens, hundreds, or even thousands of computing devices 14. Similarly, while for purposes of illustration and brevity the CMS 12 and the cloud service module 36 are shown as being executed on a single computing device, in practice the CMS 12 and the cloud service module 36 may be distributed over any number of computing devices.

The executing processes comprise a plurality of containers 20-1-20-N, 20-A1 (generally, containers 20). Each container 20 is associated with a particular pod 22-1-22-N, 22-A1 (generally, pods 22). The pods 22 are logical constructs maintained by the CMS 12 and comprise groupings of one or more containers 20. The pods 22 are illustrated in dashed outline in the computing devices 14 solely for convenience to visually illustrate the association between certain pods 22 and certain containers 20. In some examples, each container 20 generates a corresponding logfile 38-1-38-N, 38-A1 (generally, logfiles 38), however, in other examples the containers 20 may, for example, send log messages directly to corresponding LCAs 24 without a need for a logfile 38. Each container 20 may log, or store, log messages to the corresponding logfile 38 with any information and upon the occurrence of any event based on the particular design of the respective container 20.

In this example, each container 20 may also be associated with a particular namespace 40-1-40-N, 40-A1 (generally, namespaces 40). The namespace 40 are also logical constructs maintained by the CMS 12. The particular namespace 40 associated with a particular pod 22 is immutable metadata of the pod 22 because the namespace 40 cannot change during a lifetime of the pod 22. The namespaces 40 are illustrated in dashed outline in the computing devices 14 solely for convenience to visually illustrate the association between certain namespaces 40 and certain pods 22.

The CMS 12 maintains immutable metadata 28-1-28-N, 28-A1 for each pod 22-1-22-N, 22-A1, respectively. The immutable metadata 28-1 associated with the pod 22-1 contains a UID of the pod 22-1 having a value of "P_IDA." The immutable metadata 28-1 identifies a name of the pod 22-1 as "P_NAMEA." The immutable metadata 28-1 contains a UID of the namespace 40-1 with which the pod 22-1 is associated. The UID of the namespace 40-1 has a value of "N_IDA." The immutable metadata 28-1 identifies a name of the namespace 40-1 as "N_NAMEA." The immutable metadata 28-1 also identifies the containers 20-1, 20-2 associated with the pod 22-1.

The CMS 12 also maintains mutable metadata 44-1, 44-N, 44-A1 (generally, mutable metadata 44) associated with containers 20, pods 22, and/or namespaces 40. Mutable metadata comprises metadata that may change during the lifetime of an entity, such as a container 20, a pod 22, or a namespace 40. For example, mutable metadata 44-1 indicates that a current execution status of the container 20-2 is "Paused." If the container 20-2 subsequently changes from the paused status to the running status, the mutable metadata 44-1 will change to indicate that the container 20-2 has an execution status of running.

A central log agent 46 monitors the CMS 12 for the creation of new immutable metadata and changes in mutable metadata. For example, when the CMS 12 generates the pod 22-1, new immutable metadata, such as the name of the pod 22-1, will be generated. The CMS 12 also generates information, such as a UID that refers to the immutable metadata. When the central log agent 46 determines that new mutable metadata has been generated by the CMS 12, the central log agent 46 may generate a log entry 48 that includes a timestamp 50 that identifies a time at which the immutable metadata was generated by the CMS 12, and information 52 that identifies the immutable metadata and the UID associated with the immutable metadata. The central log agent 46 sends the log entry 48 to the centralized logging system 34 to identify the association between the UID and the immutable metadata, in this case, the name of the pod 22-1.

Similarly, when the central log agent 46 determines that the mutable metadata 44-1 has changed, the central log agent 46 generates a log entry 54 that includes a timestamp 56 that identifies a time at which the mutable metadata 44-1 changed, which, in this example, identifies the time at which the container 20-2 went to a paused execution status. The central log agent 46 also generates information 58 that contains the mutable metadata. The central log agent 46 also generates information 60 that identifies immutable metadata with which the information 58 is associated. In this example, because the container 20-2 is associated with the pod 22-1, the information 60 identifies the pod 22-1 as the immutable metadata with which the information 58 is associated. The central log agent 46 sends the log entry 54 to the centralized logging system 34.

In some examples, the computing devices 14, and 14-1-14-N are time synchronized, so that timestamps generated by the computing devices 14, and 14-1-14-N are all synchronized.

For purposes of illustration assume that the cloud service module 36 has initiated the containers 20-1 and 20-2 in association with the pod 22-1 and in association with the namespace 40-1 on the computing device 14-1. The cloud service module 36 has also initiated the container 20-N in association with the pod 22-N and in association with the 40-N on the computing device 14-1. The container 20-1 generates and stores log messages in a logfile 38-1, the container 20-2 generates and stores log messages in a logfile 38-2, and the container 20-N generates and stores log messages in a logfile 38-N. However, as discussed above, in other examples the containers 20 may send log messages directly to corresponding LCAs 24. While for purposes of illustration only three containers 20 and three logfiles 38 are illustrated, in practice the computing device 14-1 may have tens or hundreds of executing containers 20 and corresponding logfiles 38.

Because the LCA 24-1 is a component of the computing device 14-1, functionality implemented by the LCA 24-1 may be attributed to the computing device 14-1 generally. Moreover, in examples where the LCA 24-1 comprises software instructions that program a processor device to carry out functionality discussed herein, functionality implemented by the LCA 24-1 may be attributed herein to such processor device. For each container 20 that executes on the computing device 14-1 and generates log messages, the LCA 24-1 initiates a request to the CMS 12 for metadata associated with the respective container 20. In response, the CMS 12 provides immutable metadata, such as the UIDs associated with the pod 22 and the namespace 40 with which the container 20 is associated. The log collection agent 24-1 may store this information in a log table 62-1 that contains entries for each container 20. For example, an entry 64-1 corresponds to the container 20-1 and identifies the logfile 38-1 associated with the container 20-1, the pod 22-1 with which the container 20-1 is associated, the UID of the pod 22-1, and the namespace associated with the pod 22-1 and the UID associated with that namespace. Entries 64-2 and 64-N contain similar information for the containers 20-2 and 20-N, respectively.

The LCA 24-1 monitors the logfiles 38 to identify new log messages generated by the containers 20-1, 20-2 and 20-N. In other examples, where no logfiles 38 are used, the LCA 24-1 may receive log messages directly from a container 20-1, 20-2, 20-N. When a new log message is logged to a logfile 38, the LCA 24-1 generates a log entry that contains the log message and the UIDs of immutable metadata associated with the corresponding container 20, and sends the log entry to the centralized logging system 34. For example, assume that the container 20-1 generates the log message 21 and stores the log message 21 in the logfile 38-1. The LCA 24-1 monitors the logfile 38-1 and determines that the log message 21 has been stored in the logfile 38-1. The LCA 24-1 generates the log entry 32 and accesses the entry 64-1 that corresponds to the container 20-1 to obtain the UID of the pod 22-1 with which the container 20-1 is associated, and the UID of the namespace 40-1 with which the container 20-1 is associated. The LCA 24-1 includes the UID of the pod 22-1 and the UID of the namespace 40-1 in the log entry 32, and sends the log entry 32 to the centralized logging system 34. A similar process may be repeated for each log message logged to any logfile 38 on the computing device 14-1. In other examples, the containers 20 may send log messages 21 directly to the corresponding LCA 24 rather than store such messages in a logfile 38.

Similar processing occurs on the computing device 14-N for each log message logged to the logfile 38-A1. In particular, a LCA 24-N initiates a request to the CMS 12 for metadata of a logged entity associated with the container 20-A1. In response, the CMS 12 sends a UID of the pod 22-A1 and a UID of the namespace 40-A1 to the LCA 24-N. The LCA 24-N stores an entry 64-A1 in a log table 62-N that identifies the log associated with the container 20-A1, the pod associated with the container 20-A1 and the UID associated with that pod, and the namespace associated with the container 20-A1 and the UID associated with that namespace. When the container 20-A1 logs messages to the logfile 38-A1, the LCA 24-N obtains the log message, generates a log entry that contains the log message and the UIDs of the pod 22-A1 and the namespace 40-A1, and sends the log message to the centralized logging system 34.

Because the LCAs 24 need only request the immutable metadata of the logged entity with which each container 20 is associated once, message traffic between the LCAs 24 and the CMS 12 is minimized, and processing overhead of the CMS 12 is reduced. Because the UIDs associated with the immutable metadata are generally substantially smaller in size than the immutable metadata to which the UIDs refer, the overall size of the traffic between the LCAs 24 and the centralized logging system 34 is likewise reduced.

Figure 3:
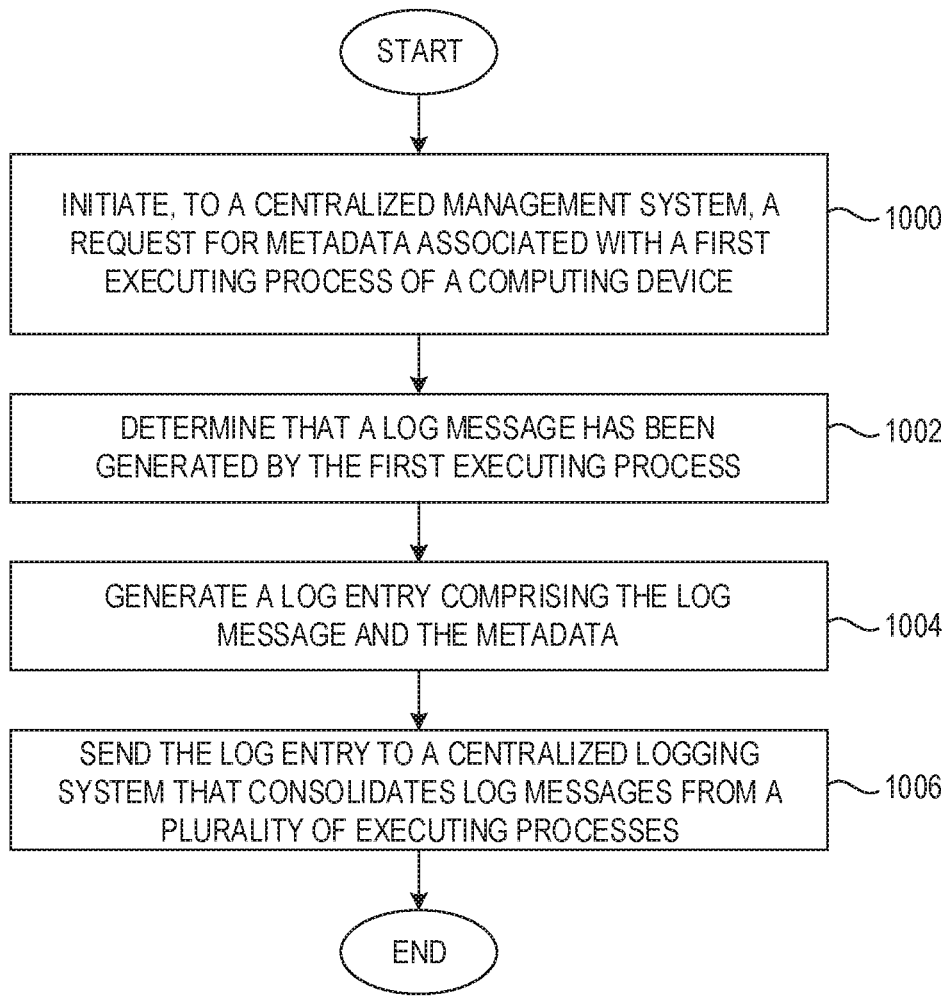
FIG. 3 is a flowchart of a process for supplementing log messages with metadata according to one example.

FIG. 3 is a flowchart of a process for supplementing log messages with metadata according to one example. FIG. 3 will be discussed in conjunction with FIG. 2. While FIG. 3 will necessarily be discussed in a certain sequence, the examples are not limited to the sequence in which the blocks are discussed. The LCA 24-1 determines that the container 20-1 (i.e. a first executing process) generates log messages and initiates a request to the CMS 12 for metadata associated with the container 20-1 (FIG. 3, block 1000). The LCA 24-1 may make this determination in any number of ways, but, in one example, the CMS 12 may send the LCA 24-1 a message that indicates that the container 20-1 logs messages. In another example, configuration data (not illustrated) on the computing device 14-1 may indicate that the container 20-1 logs messages to a particular logfile, such as the logfile 38-1. In yet another example, the LCA 24-1 may continually monitor a particular logfile directory for the existence of a new logfile 38 and detect the logfile 38-1 after its creation. In yet another example, the LCA 24-1 may first receive a log message from the container 20-1 and thereby determine that the container 20-1 generates log messages.

The CMS 12 accesses the entry 48 and determines that the container 20-1 is associated with the pod 22-1 and the namespace 40-1. If UIDs for the pod 22-1 and the namespace 40-1 have not yet been generated, the CMS 12 may generate UIDs for the pod 22-1, and the namespace 40-1, that identify immutable metadata associated with the pod 22-1. The CMS 12 sends the UIDs of the pod 22-1 and the namespace 40-1 to the LCA 24-1. The LCA 24-1 may then generate the entry 64-1 that associates the logfile 38-1, the container 20-1, the pod 22-1 and the namespace 40-1 with one another, and that identifies the UIDs of the pod 22-1 and the namespace 40-1.

The LCA 24-1 determines that the log message 21 has been generated by the container 20-1 (FIG. 3, block 1002). The LCA 24-1 generates the log entry 32 that includes the log message 21 and the UIDs of the pod 22-1 and the namespace 40-1 (FIG. 3, block 1004). The LCA 24-1 sends the log entry 32 to the centralized logging system 34 (FIG. 3, block 1006).

In one example, the centralized logging system 34 comprises a search engine, such as the Elasticsearch search engine. Log entries sent to the centralized logging system 34 may be indexed by keywords and/or other attributes of the log entries. Queries may then be submitted to the centralized logging system 34 for log entries associated with particular containers 20, pods 22 and/or namespaces 40. Because, as discussed above with regard to FIG. 1, the central log agent 46 generates log entries that associate a UID with a particular immutable metadata, such as the name of a pod 22, the centralized logging system 34 can identify the particular immutable metadata that is associated with a UID contained in a log entry generated by a LCA 24. While the particular mechanism for associating immutable metadata and mutable metadata with a particular log entry may differ depending on the particular centralized logging system 34, in one example in an object-oriented centralized logging system 34, immutable metadata may be stored as a parent object, immutable metadata may be stored as a child object that refers to the parent object via a UID, and each log entry may be stored as a child object that refers to the parent object via a UID.

Figure 4A:
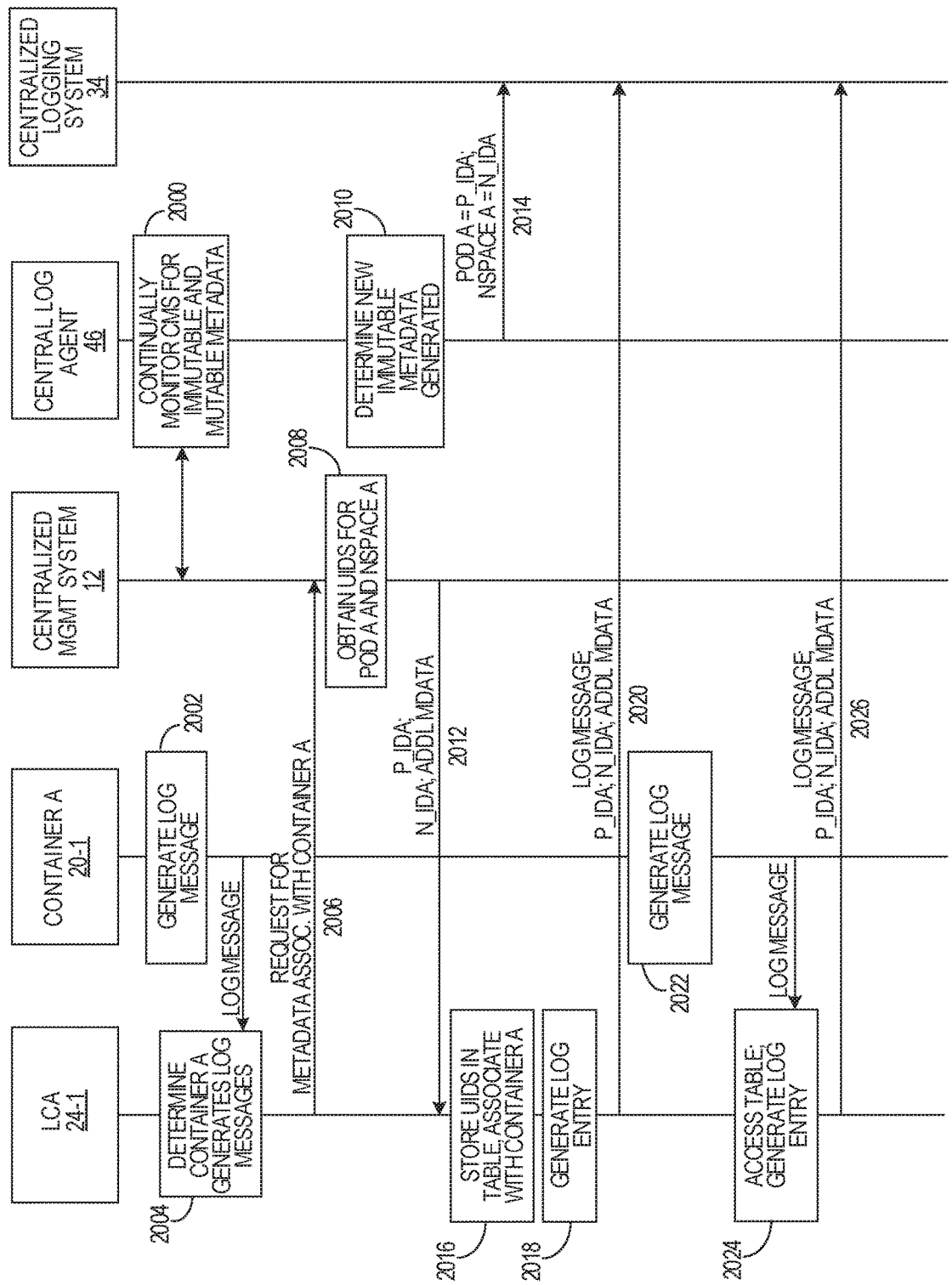
FIGS. 4A-4B are message flow diagrams that illustrate an example flow of messages between, and actions taken by, components of the system illustrated in FIG. 2 according to one example.
Figure 4B:
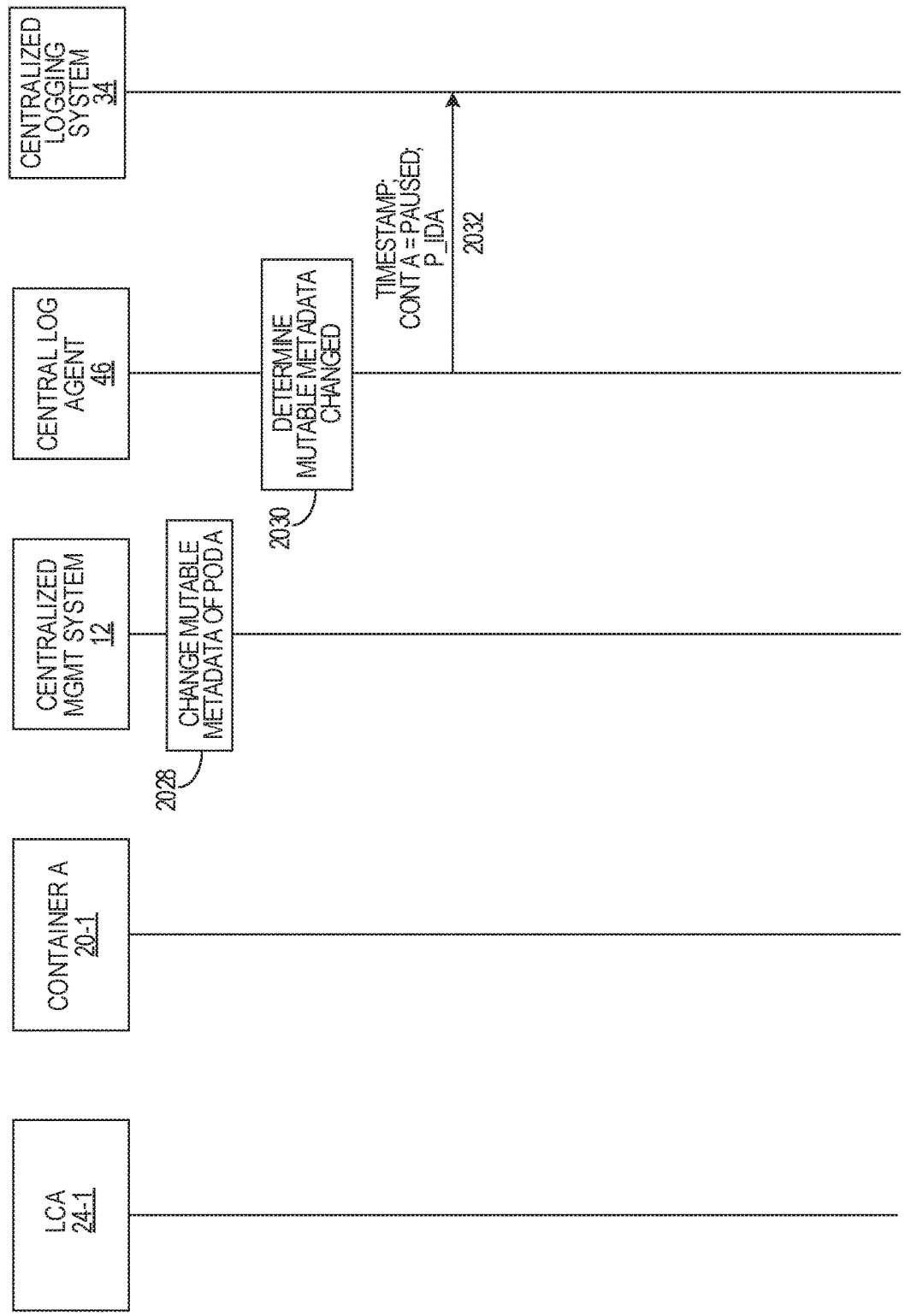

FIGS. 4A-4B are message flow diagrams that illustrate an example flow of messages between, and actions taken by, components of the system 10 illustrated in FIG. 2 according to one example. Referring first to FIG. 4A, the central log agent 46 continually monitors the centralized management system 12 for new immutable metadata and changes in mutable metadata (step 2000). The container 20-1 stores a log message to the logfile 38-1 (step 2002). As mentioned previously, in other examples the container 20-1 may send the log message directly to the LCA 24-1. The LCA 24-1 determines that the container 20-1 generates log messages (step 2004). As discussed above with regard to FIG. 3 this determination could be made any number of ways, including for example, by determining that the logfile 38-1 has been generated. Alternatively, for example, this determination could be made via receipt of a log message directly from the container 20-1. The LCA 24-1 sends to the CMS 12 a request for metadata of a logged entity with which the container 20-1 is associated (step 2006). The CMS 12 obtains UIDs for the pod 22-1 and the namespace 40-1 (step 2008). At some point in time, the central log agent 46 determines that the UIDs for the pod 22-1 and the namespace 40-1 have been generated (step 2010). The CMS 12 sends a message to the LCA 24-1 that contains the UIDs for the pod 22-1 and the namespace 40-1 and the immutable metadata, such as the pod name and namespace name, to which the UIDs refer (step 2012). The message may also include any additional metadata desired to be logged with log messages generated by the container 20-1.

The central log agent 46 generates a log entry that identifies the UID associated with the pod 22-1 and the immutable metadata of the pod 22-1, in this example the name of the pod 22-1 and the UID associated with the namespace 40-1 and the immutable metadata of the namespace 40-1, in this example the name of the namespace 40-1. The central log agent 46 sends the log entry to the centralized logging system 34 (step 2014).

The LCA 24-1 associates the UIDs of the pod 22-1 and the namespace 40-1 with the container 20-1, and stores this information in the entry 64-1 of the log table 62-1 (step 2016). The LCA 24-1 generates the log entry 32 that includes the log message logged by the container 20-1 and the UIDs of the pod 22-1 and the namespace 40-1, and any additional metadata provided by the CMS 12, and sends the log entry 32 to the centralized logging system 34 (steps 2018-2020). The container 20-1 logs another log message to the logfile 38-1 (step 2022). The LCA 24-1 identifies the new log message, accesses the entry 64-1 from the log table 62-1 and generates a new log entry (step 2024). The LCA 24-1 sends the new log entry to the centralized logging system 34 (step 2026). Note that the LCA 24-1 need not send any messages to the CMS 12 to obtain any immutable metadata associated with the container 20-1 because the immutable metadata is stored in the log table 62-1.

In FIG. 4B, the CMS 12 changes the mutable metadata associated with the container 20-1 (step 2028). In particular, the container 20-1 has gone from a running execution status to a paused execution status. The central log agent 46 determines that the mutable metadata associated with the container 20-1 has changed (step 2030). The central log agent 46 generates a log entry that includes a timestamp that identifies a time at which the mutable metadata changed, and generates information that identifies immutable metadata with which the mutable metadata is associated. In this example, because the container 20-1 is associated with the pod 22-1, the information identifies the pod 22-1 as the immutable metadata with which the mutable metadata 44-1 is associated. The central log agent 46 sends the log entry to the centralized logging system 34 (step 2032).

Figure 5:
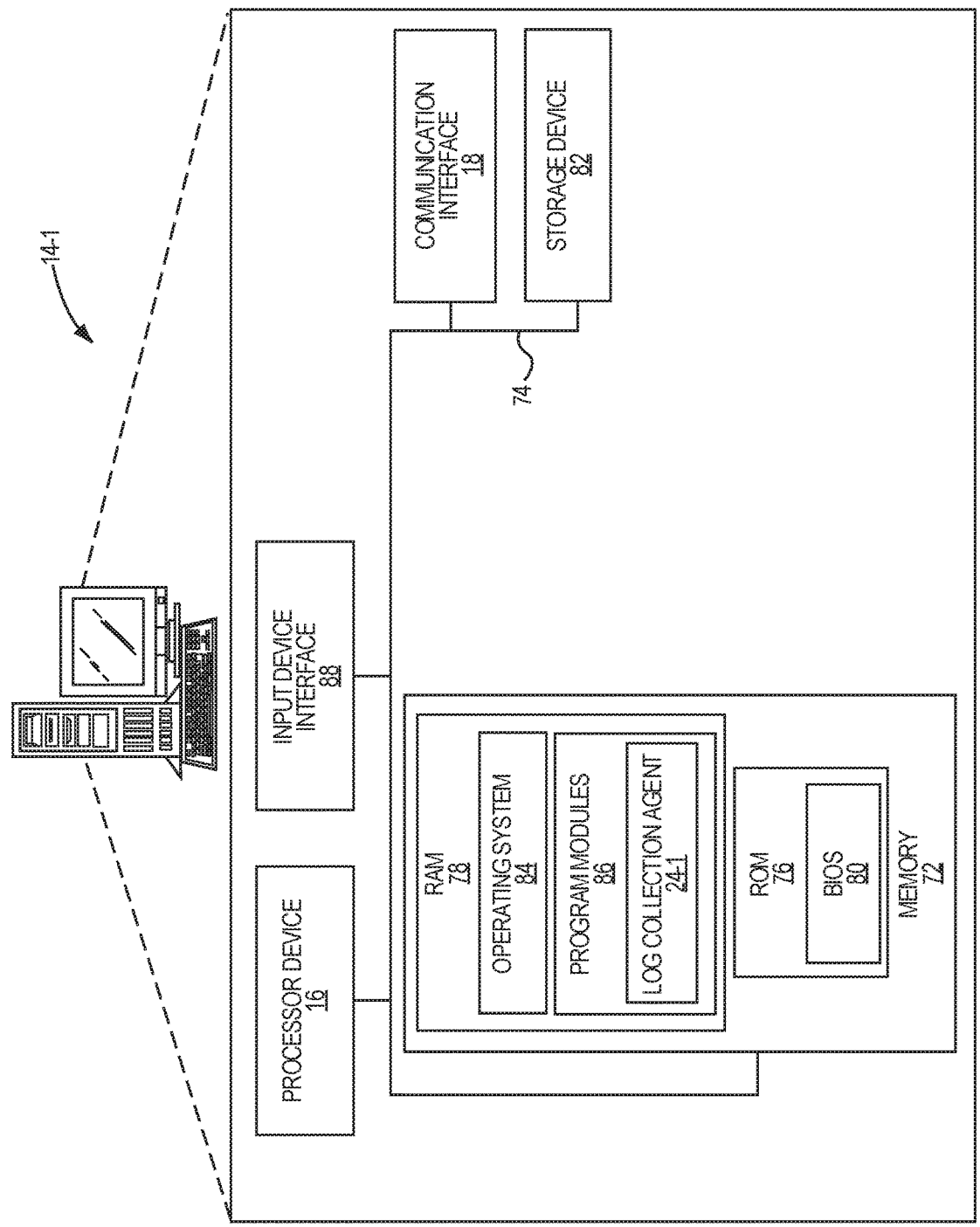
FIG. 5 is a block diagram of a computing device suitable for implementing examples according to one example.

FIG. 5 is a block diagram of the computing device 14-1 suitable for implementing examples according to one example. The computing device 14-1 may comprise any computing or electronic device capable of including firmware, hardware, and/or executing software instructions to implement the functionality described herein, such as a computer server, a desktop computing device, or the like. The computing device 14-1 includes the processor device 16, a memory 72, and a system bus 74. The system bus 74 provides an interface for system components including, but not limited to, the memory 72 and the processor device 16. The processor device 16 can be any commercially available or proprietary processor.

The system bus 74 may be any of several types of bus structures that may further interconnect to a memory bus (with or without a memory controller), a peripheral bus, and/or a local bus using any of a variety of commercially available bus architectures. The memory 72 may include non-volatile memory 76 (e.g., read-only memory (ROM), erasable programmable read-only memory (EPROM), electrically erasable programmable read-only memory (EEPROM), etc.), and volatile memory 78 (e.g., random-access memory (RAM)). A basic input/output system (BIOS) 80 may be stored in the non-volatile memory 76 and can include the basic routines that help to transfer information between elements within the computing device 14-1. The volatile memory 78 may also include a high-speed RAM, such as static RAM, for caching data.

The computing device 14-1 may further include or be coupled to a non-transitory computer-readable storage medium such as a storage device 82, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 82 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and further, that any such media may contain computer-executable instructions for performing novel methods of the disclosed examples.

A number of modules can be stored in the storage device 82 and in the volatile memory 78, including an operating system 84 and one or more program modules 86, such as the LCA 24-1, which may implement the functionality described herein in whole or in part. It is to be appreciated that the examples can be implemented with various commercially available operating systems 84 or combinations of operating systems 84.

A number of modules can be stored in the storage device 82 and in the volatile memory 78, including, by way of non-limiting example, the LCA 24-1. All or a portion of the examples may be implemented as a computer program product stored on a transitory or non-transitory computer-usable or computer-readable storage medium, such as the storage device 82, which includes complex programming instructions, such as complex computer-readable program code, to cause the processor device 16 to carry out the steps described herein. Thus, the computer-readable program code can comprise software instructions for implementing the functionality of the examples described herein when executed on the processor device 16. The processor device 16, in conjunction with the LCA 24-1 in the volatile memory 78, may serve as a controller, or control system, for the computing device 14-1 that is to implement the functionality described herein.

An operator may also be able to enter one or more configuration commands through a keyboard (not illustrated) or a pointing device such as a mouse (not illustrated). Such input devices may be connected to the processor device 16 through an input device interface 88 that is coupled to the system bus 74 but can be connected by other interfaces such as a parallel port, an Institute of Electrical and Electronic Engineers (IEEE) 1394 serial port, a Universal Serial Bus (USB) port, an IR interface, and the like.

The computing device 14-1 may also include the communication interface 18 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
   determining, by a central log agent on a computing device comprising a processor device, that a first unique identifier that corresponds to a new first compute entity on a first remote computing device has been generated;
   determining a first compute entity name of the new first compute entity;
   generating a first log message that contains the first unique identifier and the first compute entity name; and
   storing the first log message in a centralized logging system.

2. The method of claim 1 wherein determining that the first unique identifier that corresponds to the new first compute entity on the first remote computing device has been generated comprises:
   continually monitoring a centralized management system; and
   determining that the centralized management system has generated the first unique identifier that corresponds to the new first compute entity on the first remote computing device.

3. The method of claim 1 wherein generating the log message that contains the first unique identifier and the first compute entity name further comprises:
   generating a timestamp; and
   generating the first log message that contains the first unique identifier, the first compute entity name, and the timestamp.

4. The method of claim 1 further comprising:
   subsequent to storing the first log message in the centralized logging system, determining that a characteristic associated with the new first compute entity on the first remote computing device has changed;
   generating a second log message that contains a timestamp, the first unique identifier, and data that identifies the change in characteristic; and
   storing the second log message in the centralized logging system.

5. The method of claim 4 wherein the characteristic comprises an execution status characteristic, and wherein the change in characteristic is from a running execution status to a paused execution status.

6. The method of claim 1 wherein the first unique identifier is textual and is immutable for a life of the new first compute entity.

7. The method of claim 1 further comprising:
   determining, by the central log agent, that a second unique identifier that corresponds to a new second compute entity on the first remote computing device has been generated;
   determining a second compute entity name of the new second compute entity;
   generating a second log message that contains the second unique identifier and the second compute entity name; and
   storing the second log message in the centralized logging system.

8. The method of claim 7 wherein the new first compute entity comprises a namespace on the first remote computing device and the new second compute entity comprises a pod on the first remote computing device that groups one or more containers on the first remote computing device.

9. The method of claim 1 further comprising:
   determining, by the central log agent, that a second unique identifier that corresponds to a new second compute entity on a second remote computing device has been generated;
   determining a second compute entity name of the new second compute entity;
   generating a second log message that contains the second unique identifier and the second compute entity name; and
   storing the second log message in the centralized logging system.

10. The method of claim 1 wherein the first remote computing device includes a logging agent configured to generate log messages about the new first compute entity.

11. The method of claim 1 further comprising:
    receiving, by a centralized management system, a request from a log collection agent on the first remote computing device for an identifier to use with log messages associated with the new first compute entity; and sending, by the centralized management system to the log collection agent, the first unique identifier and not sending the first compute entity name to the log collection agent.

12. A computing device, comprising:
a memory; and
a processor device coupled to the memory to:
  determine, by a central log agent, that a first unique identifier that corresponds to a new first compute entity on a first remote computing device has been generated;
  determine a first compute entity name of the new first compute entity;
  generate a first log message that contains the first unique identifier and the first compute entity name; and
  store the first log message in a centralized logging system.

13. The computing device of claim 12 wherein to determine that the first unique identifier that corresponds to the new first compute entity on the first remote computing device has been generated, the processor device is further to:
  continually monitor a centralized management system; and
  determine that the centralized management system has generated the first unique identifier that corresponds to the new first compute entity on the first remote computing device.

14. The computing device of claim 12 wherein the processor device is further to:
  subsequent to storing the first log message in the centralized logging system, determine that a characteristic associated with the new first compute entity on the first remote computing device has changed;
  generate a second log message that contains a timestamp, the first unique identifier, and data that identifies the change in characteristic; and
  store the second log message in the centralized logging system.

15. The computing device of claim 12 wherein the processor device is further to:
  determine, by the central log agent, that a second unique identifier that corresponds to a new second compute entity on the first remote computing device has been generated;
  determine a second compute entity name of the new second compute entity;
  generate a second log message that contains the second unique identifier and the second compute entity name; and
  store the second log message in the centralized logging system.

16. The computing device of claim 12 wherein the processor device is further to:
  determine, by the central log agent, that a second unique identifier that corresponds to a new second compute entity on a second remote computing device has been generated;
  determine a second compute entity name of the new second compute entity;
  generate a second log message that contains the second unique identifier and the second compute entity name; and
  store the second log message in the centralized logging system.

17. A computer program product stored on a non-transitory computer-readable storage medium and including instructions configured to cause a processor device to:
  determine, by a central log agent, that a first unique identifier that corresponds to a new first compute entity on a first remote computing device has been generated;
  determine a first compute entity name of the new first compute entity;
  generate a first log message that contains the first unique identifier and the first compute entity name; and
  store the first log message in a centralized logging system.

18. The computer program product of claim 17 wherein to determine that the first unique identifier that corresponds to the new first compute entity on the first remote computing device has been generated, the instructions further cause the processor device to:
  continually monitor a centralized management system; and
  determine that the centralized management system has generated the first unique identifier that corresponds to the new first compute entity on the first remote computing device.

19. The computer program product of claim 17 wherein the instructions further cause the processor device to:
  subsequent to storing the first log message in the centralized logging system, determine that a characteristic associated with the new first compute entity on the first remote computing device has changed;
  generate a second log message that contains a timestamp, the first unique identifier, and data that identifies the change in characteristic; and
  store the second log message in the centralized logging system.

20. The computer program product of claim 17 wherein the instructions further cause the processor device to:
  determine, by the central log agent, that a second unique identifier that corresponds to a new second compute entity on the first remote computing device has been generated;
  determine a second compute entity name of the new second compute entity;
  generate a second log message that contains the second unique identifier and the second compute entity name; and
  store the second log message in the centralized logging system.

* * * * *